United States Patent [19]
Turan

[11] Patent Number: 5,975,323
[45] Date of Patent: Nov. 2, 1999

[54] EXTENDER FOR ELECTRICAL BOX

[76] Inventor: Scott R. Turan, P.O. Box 963, Grand Lake, Colo. 80447

[21] Appl. No.: 08/953,328

[22] Filed: Oct. 17, 1997

[51] Int. Cl.$^6$ .................................................... H02G 3/08
[52] U.S. Cl. ........................ 220/3.7; 220/3.94; 220/919; 220/4.02
[58] Field of Search ................................. 220/3.7, 3.94, 220/3.92, 3.2, 3.3, 918, 919, 921, 4.02, 4.03, 8, 693

[56] References Cited

U.S. PATENT DOCUMENTS

| | | | |
|---|---|---|---|
| 1,197,644 | 9/1916 | Lutz | 220/3.7 |
| 2,265,926 | 12/1941 | Pike | 220/3.94 |
| 2,378,861 | 6/1945 | Peevey | 220/3.7 |
| 4,023,697 | 5/1977 | Marrero | 220/3.92 |
| 4,927,039 | 5/1990 | McNab | 220/3.7 |
| 5,054,956 | 10/1991 | Huang | 220/3.7 |
| 5,402,902 | 4/1995 | Bouley | 220/3.7 |

FOREIGN PATENT DOCUMENTS 126535   1/1932   Germany ................................ 220/3.7

OTHER PUBLICATIONS

1–page specification sheet for "The Box Extender" manufactured by Arlington Industries, Inc.

Primary Examiner—Stephen J. Castellano
Attorney, Agent, or Firm—William E. Hein

[57] ABSTRACT

An extender for conventional round electrical boxes permits the user to incrementally extend the height of the box, as dictated by a particular application. The extender is adapted to fit inside the electrical box and to extend the height of the box, as determined by the thickness of a spacer placed between mounting ears of the extender and mounting columns of the box that are aligned when the extender is inserted into the box.

4 Claims, 1 Drawing Sheet

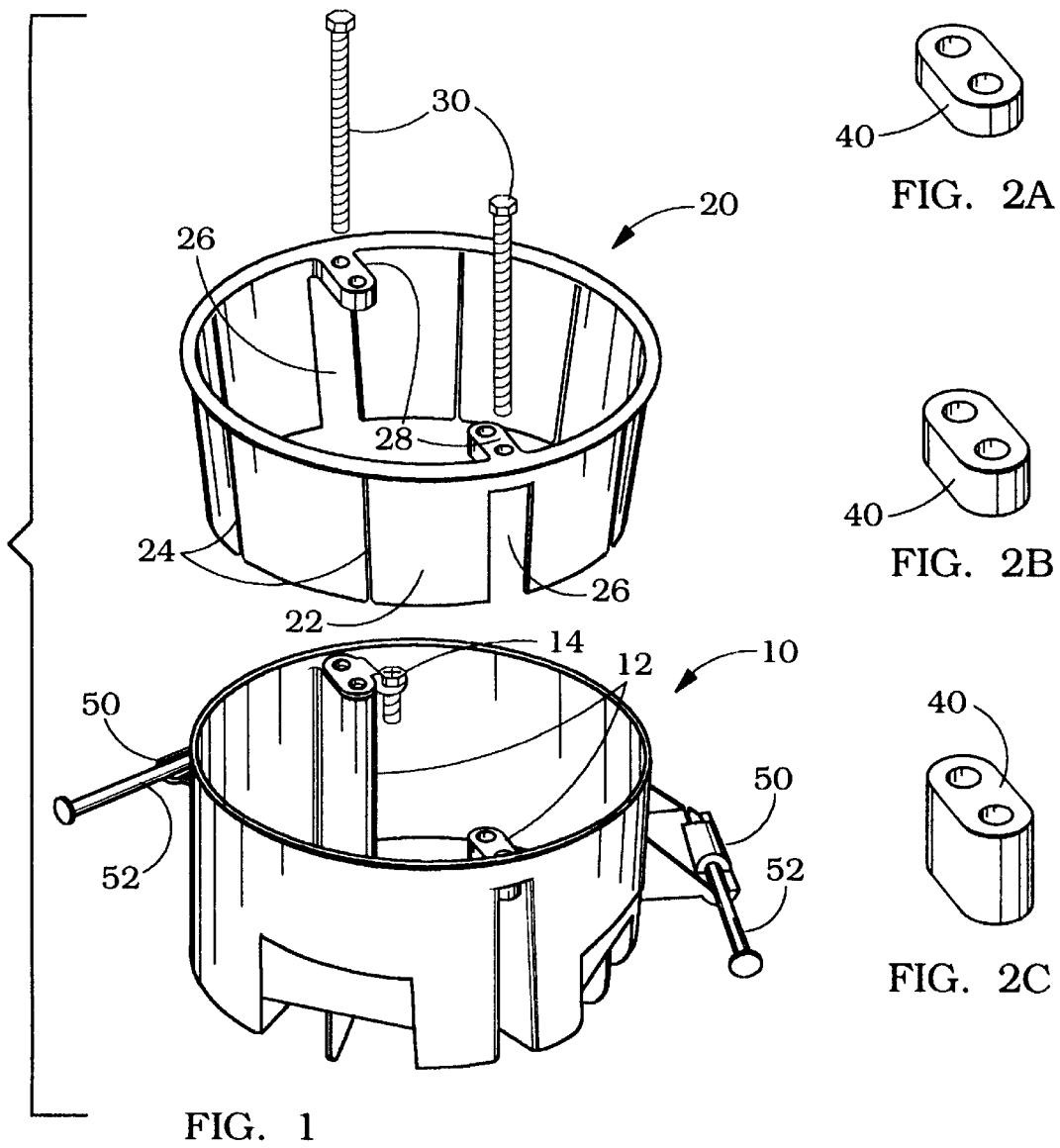
FIG. 2A
FIG. 2B
FIG. 2C
FIG. 1
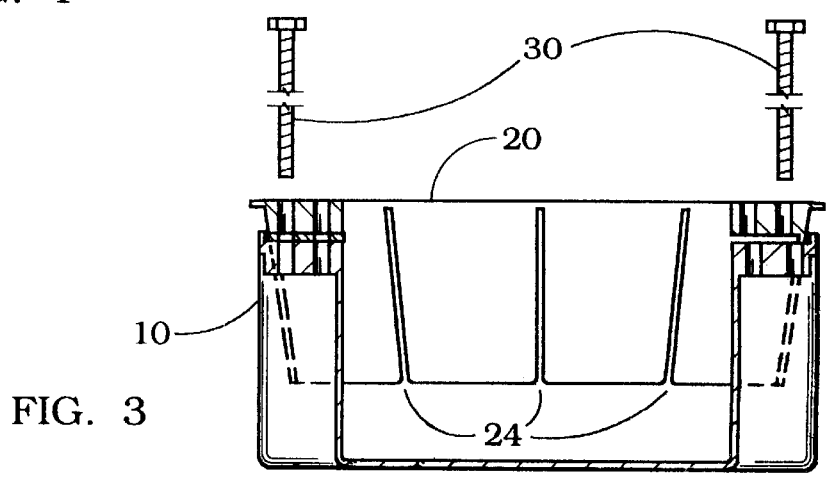
FIG. 3

EXTENDER FOR ELECTRICAL BOX

BACKGROUND AND SUMMARY OF THE INVENTION

This invention relates generally to round electrical boxes and, more particularly, to an extender for such boxes that enables compliance with a certain provision of the National Electrical Code.

Article 370-20 of the National Electrical Code requires that in walls or ceilings of concrete, tile or other noncombustible material, electrical boxes shall be installed so that the front edge of the box will not set back of the finished surface more than ¼" or 6.35 mm. It is also provided that in walls or ceilings constructed of wood or other combustible material, electrical boxes shall be flush with the finished surface or project therefrom. In many applications, it is not possible to meet these requirements of the National Electrical Code using conventional 4" round plastic nail-on electrical boxes, such as the Carlon B120A electrical box, for example. This is because the height of these boxes does not permit them to be mounted such that the front edge thereof is flush with the finished surface, as required by the National Electrical Code. Electrical inspectors are therefore presently unable to enforce compliance with the Article 370-20 of the National Electrical Code in applications in which use of these conventional round boxes do not permit compliance.

The present invention provides an extender for a conventional round electrical box which permits the user to incrementally extend the height of the box, as required in a particular application. The extender is adapted to fit inside the electrical box and to extend the height of the box, as determined by the thickness of a spacer placed between mounting ears of the extender and mounting columns of the box that are aligned when the extender is inserted into the box.

BRIEF DESCRIPTION OF THE DRAWINGS

FIG. 1 is a pictorial diagram illustrating a conventional 4" round electrical box and the extender of the present invention.

FIGS. 2A, 2B, and 2C illustrate spacers that are employed with the electrical box and extender of FIG. 1 to extend the overall height of the electrical box by the thickness of the spacer.

FIG. 3 is a sectional pictorial diagram illustrating the electrical box and extender of FIG. 1 when assembled.

DETAILED DESCRIPTION OF THE INVENTION

Referring now to FIG. 1, there is shown a commercially available 4" round plastic nail-on electrical box 10, readily available from a number of manufacturers. One commonly used 4" box is known as the Carlon B120A electrical box. The present inventions applies as well to other round electrical boxes, such as the commercially available 3" round box. Box 10 conventionally includes a pair of nailing flanges 50 and nails 52 to permit attachment of box 10 to a framing structure. Box 10 also conventionally includes a pair of integrally molded, diametrically opposed mounting columns 12 into which a fixture cover is conventionally screwed. A grounding plate and screw assembly 14 is conventionally provided on top of one of the mounting columns 12. Also illustrated in FIG. 1 is a circular extender 20 of the present invention that is fabricated of a non-combustible semi-flexible plastic material, and that is adapted to fit inside electrical box 10. Extender 20 includes a circular skirt 22 that contains a number of slits 24 to permit insertion of extender 20 into box 10. Skirt 22 of extender 20 also includes a pair of diametrically opposed notches 26 that are aligned with mounting columns 12 of box 10 when extender 20 is inserted into box 10. Extender 20 further includes a pair of inwardly protruding, diametrically opposed mounting ears 28 positioned in alignment with notches 26 and adapted to align with mounting columns 12 of box 10 when extender 20 is inserted into box 10. A pair of conventional 8-32×2 ¼" screws 30 are provided to secure extender 20 to box 10 when the two are assembled, as illustrated in FIG. 3. These screws may have locking adhesive coated threads if desired. The thickness of mounting ears 28 of extender 20 is typically ¼" to provide a ¼" extension of the height of box 10 when extender 20 is inserted into box 10. If additional extended height is required, a spacer 40 may be inserted between each of the mounting ears 28 of extender 20 and mounting columns 12 of box 10 when extender 20 is inserted into box 10. Spacers 40 may be of varying thickness, such as ⅛", ¼", and ½", as illustrated in FIGS. 2A, 2B, and 2C, to provided the required extended height of box 10.

I claim:

1. A system for extending the height of a conventional round electrical fixture box of the type having a pair of integrally molded longitudinal mounting columns positioned on an inner surface of the box diametrically opposite each other, the system comprising:

a generally cylindrical extender member having a outer rim end and an inner skirt end, the extender member having a plurality of longitudinal slits formed therein, the slits extending a predetermined distance from the skirt end toward the rim end, the extender member also having a pair of diametrically opposed longitudinal slots formed therein, the pair of slots extending a predetermined distance from the skirt end toward the rim end, each one of the pair of slots having a width sufficient to clear the mounting columns on the inner surface of the box when the skirt end of the extender member is inserted into the box, the extender member having a pair of mounting ears extending inwardly from the rim end of the extender member in alignment with the pair of slots, the pair of mounting ears being formed to have a cross section substantially the same as a cross section of said mounting columns;

a pair of spacer members of predetermined height formed to have a cross section substantially the same as the cross section of said mounting ears and said mounting columns, each one of the pair of spacer members adapted to fit between respective ones of the mounting columns and the mounting ears when the extender member is inserted into the box to thereby extend the overall height of the box; and fastener means extending through the mounting ears, the spacer members, and the mounting columns to secure the extender member in position when inserted into the box.

2. A system for extending the height of a conventional round electrical fixture box as in claim 1 wherein the extender member comprises a semi-flexible plastic material.

3. A system for extending the height of a conventional round electrical fixture box as in claim 1 wherein the fastener means comprises a pair of screws.

4. A method for extending the height of a conventional round electrical fixture box of the type having a pair of integrally molded longitudinal mounting columns positioned on an inner surface of the box diametrically opposite each other, the method comprising:

providing a generally cylindrical extender member having a outer rim end and an inner skirt end, the extender member having a plurality of longitudinal slits formed therein, the slits extending a predetermined distance from the skirt end toward the rim end, the extender member also having a pair of diametrically opposed longitudinal slots formed therein, the pair of slots extending a predetermined distance from the skirt end toward the rim end, each one of the pair of slots having a width sufficient to clear the mounting columns on the inner surface of the box when the skirt end of the extender member is inserted into the box, the extender member having a pair of mounting ears extending inwardly from the rim end of the extender member in alignment with the pair of slots, the pair of mounting ears being formed to have a cross section substantially the same as a cross section of said mounting columns;

providing a pair of spacer members of predetermined height formed to have a cross section substantially the same as the cross section of said mounting ears and said mounting columns, each one of the pair of spacer members adapted to fit between respective ones of the mounting columns and the mounting ears when the extender member is inserted into the box to thereby extend the overall height of the box;

inserting the extender member into the box with each one of the pair of spacer members positioned between respective ones of the mounting columns and the mounting ears; and securing the extender member and the spacer members to the mounting columns within the box.

* * * * *